United States Patent
Boyle et al.

(10) Patent No.: US 8,639,872 B1
(45) Date of Patent: Jan. 28, 2014

(54) HYBRID DRIVE COMPRISING WRITE CACHE SPANNING NON-VOLATILE SEMICONDUCTOR MEMORY AND DISK

(75) Inventors: William B. Boyle, Lake Forest, CA (US); Mei-Man L. Syu, Fremont, CA (US); William C. Cain, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 198 days.

(21) Appl. No.: 13/149,703

(22) Filed: May 31, 2011

Related U.S. Application Data (60) Provisional application No. 61/373,488, filed on Aug. 13, 2010.

(51) Int. Cl.
*G06F 12/00* (2006.01)

(52) U.S. Cl.
USPC .......................... 711/103; 711/113; 711/138

(58) Field of Classification Search
USPC ................................. 711/103, 113
See application file for complete search history.

(56) References Cited

U.S. PATENT DOCUMENTS

| | | | |
|---|---|---|---|
| 5,333,138 A | 7/1994 | Richards et al. | |
| 5,581,785 A | 12/1996 | Nakamura et al. | |
| 5,586,291 A | 12/1996 | Lasker et al. | |
| 5,926,834 A * | 7/1999 | Carlson et al. | 711/152 |
| 6,018,788 A * | 1/2000 | Ichikawa | 711/113 |
| 6,044,439 A | 3/2000 | Ballard et al. | |
| 6,046,817 A * | 4/2000 | Brown et al. | 358/1.16 |
| 6,115,200 A | 9/2000 | Allen et al. | |
| 6,275,949 B1 | 8/2001 | Watanabe | |
| 6,429,990 B2 | 8/2002 | Serrano et al. | |
| 6,594,742 B1 * | 7/2003 | Ezra | 711/159 |
| 6,661,591 B1 | 12/2003 | Rothberg | |
| 6,662,267 B2 | 12/2003 | Stewart | |
| 6,687,850 B1 | 2/2004 | Rothberg | |
| 6,711,635 B1 * | 3/2004 | Wang | 710/56 |
| 6,754,021 B2 | 6/2004 | Kisaka et al. | |
| 6,807,630 B2 | 10/2004 | Lay et al. | |
| 6,909,574 B2 | 6/2005 | Aikawa et al. | |
| 6,968,450 B1 | 11/2005 | Rothberg et al. | |
| 7,017,037 B2 | 3/2006 | Fortin et al. | |
| 7,028,174 B1 | 4/2006 | Atai-Azimi et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Sanjiv Shah
*Assistant Examiner* — Edward Waddy, Jr.

(57) ABSTRACT

A hybrid drive is disclosed comprising a head actuated over a disk comprising a plurality of data tracks, where each data track comprises a plurality of data sectors. The hybrid drive further comprises a non-volatile semiconductor memory (NVSM) comprising a plurality of memory segments. When a write command is received from a host including write data, the write data is written to one of a disk cache and a NVSM cache, wherein the write data is eventually flushed to a non-cache area of the disk.

24 Claims, 6 Drawing Sheets

(56) References Cited

U.S. PATENT DOCUMENTS

| | | | |
|---|---|---|---|
| 7,142,385 B2 | 11/2006 | Shimotono et al. | |
| 7,334,082 B2 | 2/2008 | Grover et al. | |
| 7,395,452 B2 | 7/2008 | Nicholson et al. | |
| 7,411,757 B2 | 8/2008 | Chu et al. | |
| 7,461,202 B2 | 12/2008 | Forrer, Jr. et al. | |
| 7,472,219 B2 * | 12/2008 | Tamura et al. | 711/103 |
| 7,472,222 B2 | 12/2008 | Auerbach et al. | |
| 7,477,477 B2 | 1/2009 | Maruchi et al. | |
| 7,509,471 B2 | 3/2009 | Gorobets | |
| 7,516,346 B2 | 4/2009 | Pinheiro et al. | |
| 7,610,438 B2 | 10/2009 | Lee et al. | |
| 7,613,876 B2 | 11/2009 | Bruce et al. | |
| 7,644,231 B2 | 1/2010 | Recio et al. | |
| 7,685,360 B1 | 3/2010 | Brunnett et al. | |
| 7,752,491 B1 | 7/2010 | Liikanen et al. | |
| 2005/0044104 A1 * | 2/2005 | Kaneda et al. | 707/102 |
| 2005/0278486 A1 * | 12/2005 | Trika et al. | 711/142 |
| 2006/0195657 A1 | 8/2006 | Tien et al. | |
| 2007/0162693 A1 * | 7/2007 | Nam | 711/113 |
| 2007/0192539 A1 * | 8/2007 | Kano et al. | 711/114 |
| 2008/0040537 A1 | 2/2008 | Kim | |
| 2008/0059694 A1 | 3/2008 | Lee | |
| 2008/0130156 A1 | 6/2008 | Chu et al. | |
| 2008/0177938 A1 | 7/2008 | Yu | |
| 2008/0222353 A1 | 9/2008 | Nam et al. | |
| 2008/0256287 A1 | 10/2008 | Lee et al. | |
| 2008/0307270 A1 | 12/2008 | Li | |
| 2009/0019218 A1 | 1/2009 | Sinclair et al. | |
| 2009/0027796 A1 * | 1/2009 | Nitta | 360/31 |
| 2009/0031072 A1 | 1/2009 | Sartore | |
| 2009/0103203 A1 | 4/2009 | Yoshida | |
| 2009/0106518 A1 | 4/2009 | Dow | |
| 2009/0144501 A2 | 6/2009 | Yim et al. | |
| 2009/0150599 A1 | 6/2009 | Bennett | |
| 2009/0172324 A1 | 7/2009 | Han et al. | |
| 2009/0182933 A1 * | 7/2009 | Jang et al. | 711/103 |
| 2009/0249168 A1 | 10/2009 | Inoue | |
| 2009/0271562 A1 | 10/2009 | Sinclair | |
| 2009/0327603 A1 | 12/2009 | McKean et al. | |
| 2010/0088459 A1 | 4/2010 | Arya et al. | |
| 2011/0088041 A1 * | 4/2011 | Alameldeen et al. | 718/105 |
| 2011/0119498 A1 * | 5/2011 | Guyot | 713/189 |
| 2012/0017034 A1 * | 1/2012 | Maheshwari et al. | 711/103 |
| 2012/0023144 A1 | 1/2012 | Rub | |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

* cited by examiner

HYBRID DRIVE COMPRISING WRITE CACHE SPANNING NON-VOLATILE SEMICONDUCTOR MEMORY AND DISK

CROSS-REFERENCE TO RELATED APPLICATIONS

The present application claims priority from provisional U.S. Patent Application Ser. No. 61/373,488, filed on Aug. 13, 2010, the specification of which is incorporated herein by reference.

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figure 1A:
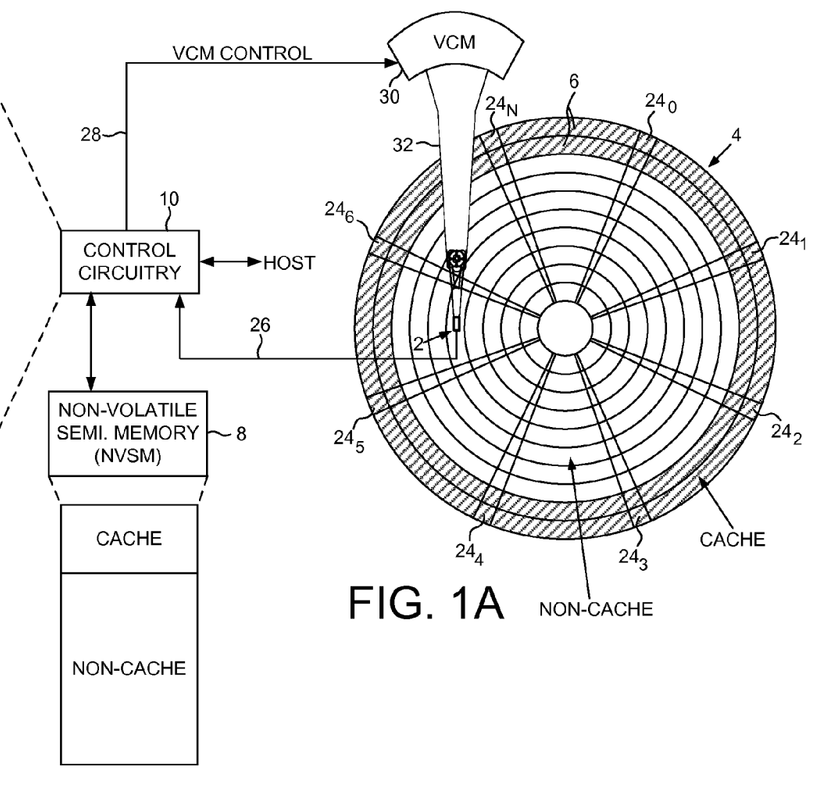
FIG. 1A shows a disk drive according to an embodiment of the present invention comprising a head actuated over a disk including a disk cache, and a non-volatile semiconductor memory (NVSM) including a NVSM cache.

FIG. 1A shows a hybrid drive according to an embodiment of the present invention comprising a head 2 actuated over a disk 4 comprising a plurality of data tracks 6, where each data track comprises a plurality of data sectors. The hybrid drive further comprises a non-volatile semiconductor memory (NVSM) 8 comprising a plurality of memory segments. Control circuitry 10 executes the flow diagram of FIG. 1B, wherein when a write command is received from a host including write data (step 12), a determination is made (step 14) whether to write the write data to one of a disk cache (step 16) and a NVSM cache (step 18). The write data is written to one of a disk cache and a NVSM cache, and during a flush operation (step 20) the write data is flushed to a non-cache area of the disk (step 22).

In the embodiment of FIG. 1A, the disk 4 comprises embedded servo sectors $24_0$-$24_N$ that define the data tracks 6. The control circuitry 10 processes a read signal 26 emanating from the head 2 to demodulate the servo sectors $24_0$-$24_N$ and generate a position error signal (PES) representing an error between the actual position of the head and a target position relative to a target track. The control circuitry 10 filters the PES using a suitable compensation filter to generate a control signal 28 applied to a voice coil motor (VCM) 30 which rotates an actuator arm 32 about a pivot in order to actuate the head 2 radially over the disk in a direction that reduces the PES.

Any suitable NVSM 8 may be employed in the embodiments of the present invention such as a suitable flash memory. In one embodiment, the NVSM 8 comprises a plurality of blocks, wherein each block comprises a plurality of memory segments referred to as pages, and each page may store one or more data sectors. The blocks are programmed a page at a time, and an entire block is erased in a unitary operation. In one embodiment, there is a limit to the number of times the blocks of the NVSM may be programmed and erased (referred to as endurance). When the NVSM reaches the limit of program/erase cycles it essentially reaches end of life (for subsequent write operations). Accordingly, in one embodiment of the present invention the disk cache helps extend the life of the NVSM by implementing a write cache that spans both the NVSM and the disk. In this manner, at least some of the write commands are cached in the disk cache which reduces write amplification in the NVSM.

In another embodiment of the present invention, implementing a write cache using both the disk and NVSM helps improve performance by writing data to both channels concurrently. For example, multiple write commands may be queued in a command queue (or a single large write command broken into multiple write commands) wherein a first part of the write data may be written to the disk cache while concurrently writing a second part of the write data to the NVSM cache.

Employing a write cache in a hybrid drive improves performance by avoiding the mechanical latency involved with accessing the disk (seek latency and rotational latency) when servicing non-sequential write commands. Instead of seeking the head around the disk to service non-sequential write commands, the write data is cached in one of the disk cache and the NVSM cache, and then later flushed to the non-cache area of the disk, for example, when the hybrid drive is idle or otherwise ready to flush the write cache. In one embodiment, the disk cache is implemented as a circular buffer so that non-sequential write commands can be written to sequential data sectors (thereby avoiding long seeks within the disk cache).

In the embodiment of FIG. 1A, the NVSM 8 comprises a cache area and a non-cache area. The non-cache area of the NVSM may be used to store data that helps improve performance of the hybrid drive, such as frequently accessed data and/or boot data for the host operating system. In one embodiment, the logical block addresses (LBAs) mapped to the non-cache area of the NVSM 8 may change over time depending on the historical use of the hybrid drive. In another embodiment, the entire NVSM 8 may be used as a write cache, and in yet another embodiment described below, the size of the NVSM cache may change over time, such as decreasing the size of the NVSM cache as the life remaining of the NVSM decreases.

Figure 1B:
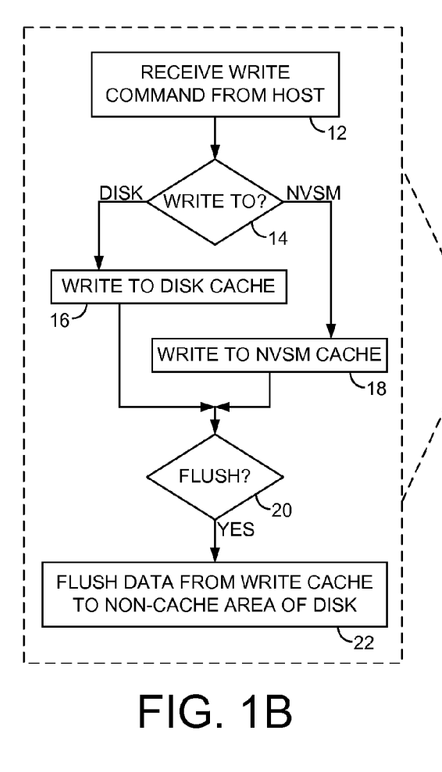
FIG. 1B is a flow diagram according to an embodiment of the present invention wherein when a write command is received the write data is cached in one of the disk cache and the NVSM cache before being flushed to a non-cache area of the disk.
Figure 1C:
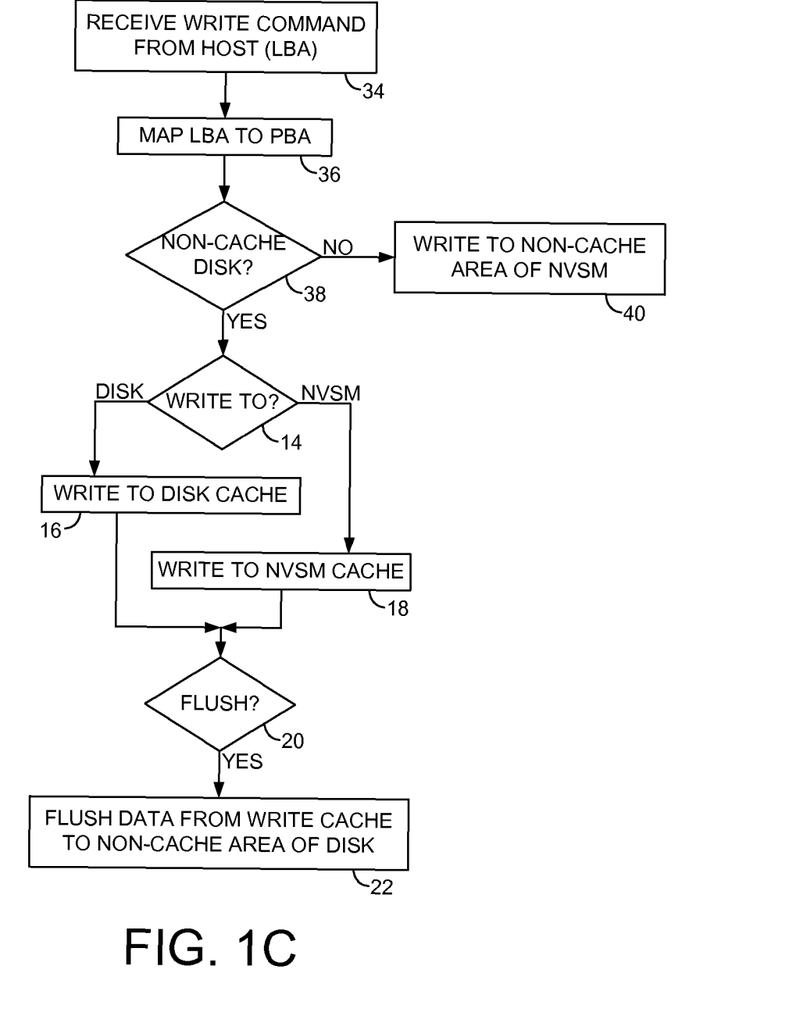
FIG. 1C is a flow diagram according to an embodiment of the present invention wherein the write data of a write command is cached if the target PBA identifies a data sector in the non-cache area of the disk.

FIG. 1C is a flow diagram according to an embodiment of the present invention that extends on the flow diagram of FIG. 1B, wherein a write command is received from a host comprising an LBA (step 34). The LBA is mapped to a physical block address (PBA) of the target data sectors (step 36), wherein if the PBA is mapped to a data sector in the non-cache area of the NVSM (step 38), the write data is written to the NVSM (step 40). If the PBA is mapped to a data sector in the non-cache area of the disk (step 38), then the write data is cached in one of the disk cache and the NVSM cache before being flushed to the non-cache area of the disk at a later time.

In one embodiment when flushing the data from the NVSM cache, the data may first be written to the disk cache in order to flush the NVSM cache quickly. The data may then be flushed from the disk cache to the non-cache area of the disk at a later time (e.g., while servicing access commands using the NVSM or while the hybrid drive is idle). In another embodiment when flushing the data from the NVSM cache, the data may be migrated to the non-cache area of the NVSM (instead of flushing the data to the disk) based on a migration policy. For example, if data stored in the NVSM cache is accessed several times by the host prior to being flushed to the disk, the migration policy may migrate the data by flushing it to the non-cache area of the NVSM instead of flushing the data to the non-cache area of the disk. In one embodiment, flushing the data from the NVSM cache to the non-cache area of the NVSM is implemented by copying the data between blocks. In an alternative embodiment, the blocks storing the cached data are simply re-assigned from the NVSM cache to the non-cache area of the NVSM.

Figure 2:
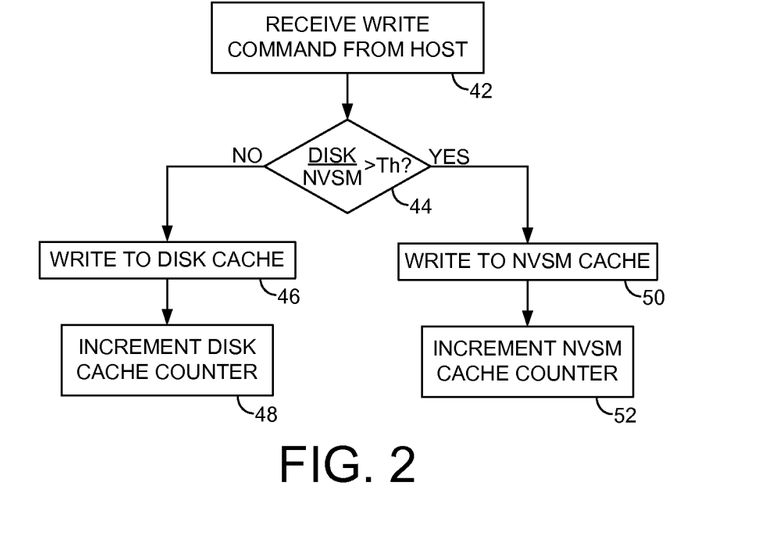
FIG. 2 is a flow diagram according to an embodiment of the present invention wherein a ratio of access to the disk cache and NVSM cache is used to select which cache to store write data.

FIG. 2 is a flow diagram according to an embodiment of the present invention wherein a disk/NVSM counter ratio is maintained at a target level in order to spread the write commands over the disk cache and the NVSM cache at a target ratio (e.g., spread the write commands evenly over the NVSM cache and the disk cache). When a write command is received from the host (step 42) a disk/NVSM counter ratio is compared to a threshold (step 44). If the ratio is less than the threshold (meaning that fewer write commands have been serviced by the disk cache), then the write data is written to the disk cache (step 46) and a disk cache counter is incremented (step 48). If the ratio is greater than the threshold (meaning that fewer write commands have been serviced by the NVSM cache), then the write data is written to the NVSM cache (step 50) and a NVSM cache counter is incremented (step 52). The counters in this embodiment may represent any suitable value, such as a number of write commands, or a total number of data sectors over the write commands.

Figure 3:
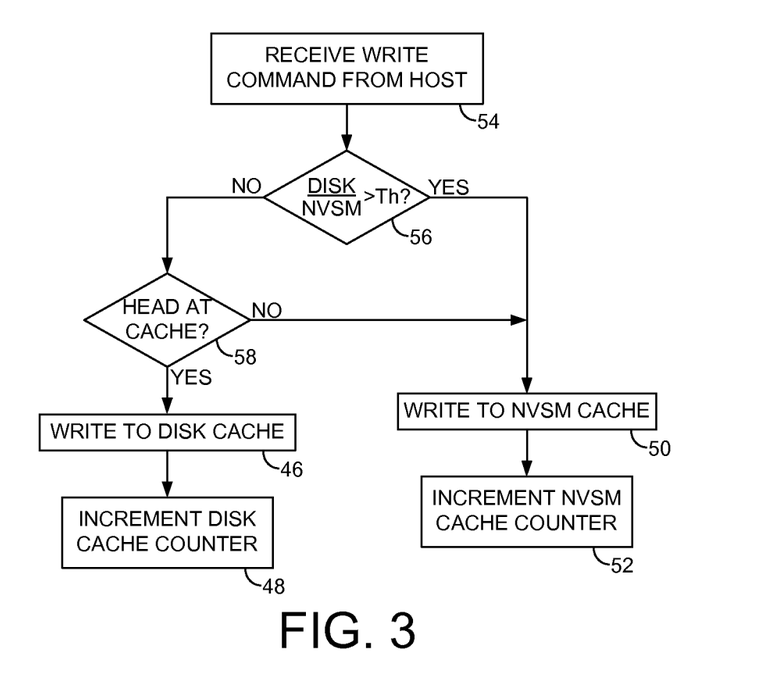
FIG. 3 is a flow diagram according to an embodiment of the present invention wherein if the disk cache is selected based on the disk/NVSM ratio, but the head is away from the disk cache, then the write data is cached in the NVSM cache.

FIG. 3 is a flow diagram according to an embodiment of the present invention that extends on the flow diagram of FIG. 2, wherein when a write command is received from the host (step 54) and the disk/NVSM counter ratio is less than the threshold (step 56) such that the disk cache is selected to cache the write data, but the head is away from the disk cache (step 58) (e.g., parked on a ramp or servicing other commands), the write data is written to the NVSM cache (thereby overriding the ratio threshold condition). Accordingly, in this embodiment the NVSM counter may increase until the head is positioned back over the disk cache wherein subsequent write commands are serviced by the disk cache until the counter ratio again reaches the target threshold. In one embodiment, the head may be considered over the disk cache at step 58 as long as the head is near the disk cache (e.g., within a threshold number of data tracks).

Figure 4:
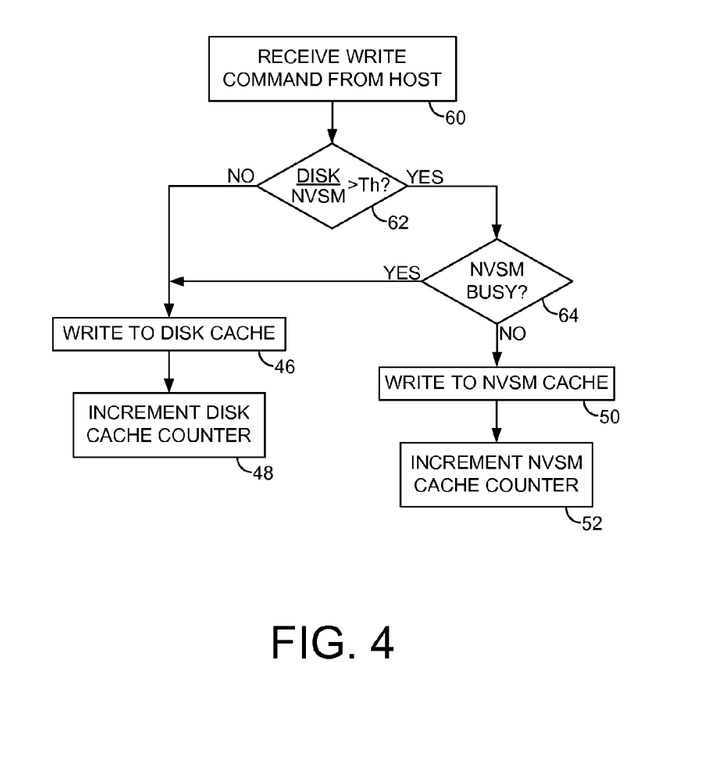
FIG. 4 is a flow diagram according to an embodiment of the present invention wherein if the NVSM cache is selected to cache write data, but the NVSM is busy servicing other commands, then the write data is cached in the disk cache.

FIG. 4 is a flow diagram according to an embodiment of the present invention that extends on the flow diagram of FIG. 2, wherein when a write command is received from the host (step 60) and the disk/NVSM counter ratio is greater than the threshold (step 62) such that the NVSM cache is selected to cache the write data, but the NVSM is busy servicing other commands (step 64), the write data is written to the disk cache (thereby overriding the ratio threshold condition). Accordingly, in this embodiment the disk counter may increase until the NVSM is no longer busy wherein subsequent write commands are serviced by the NVSM cache until the counter ratio again reaches the target threshold.

Figure 5:
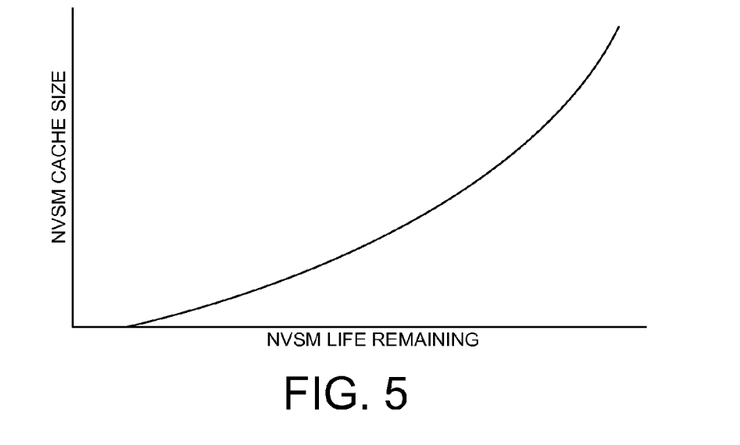
FIG. 5 shows an embodiment of the present invention wherein the size of the NVSM cache is decreased as the life remaining of the NVSM decreases.
Figure 6:
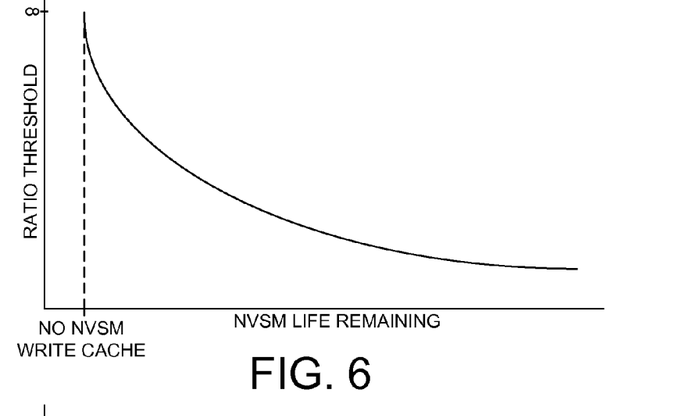
FIG. 6 shows an embodiment of the present invention wherein the disk/NVSM threshold is increased as the life remaining of the NVSM decreases.

FIG. 5 shows an embodiment of the present invention wherein as the life remaining of the NVSM decreases (due to the number of program/erase cycles increasing), the size of the NVSM cache is decreased. This embodiment helps extend the life of the NVSM since using the NVSM as a write cache increase write amplification of the NVSM. In an alternative embodiment show in FIG. 6, the threshold for the disk/NVSM counter ratio may be increased as the life remaining of the NVSM decreases so that more write data is cached in the disk cache. Both of these embodiments help reduce write amplification of the NVSM by routing more of the write data to the disk cache rather than the NVSM cache.

Figure 7A:
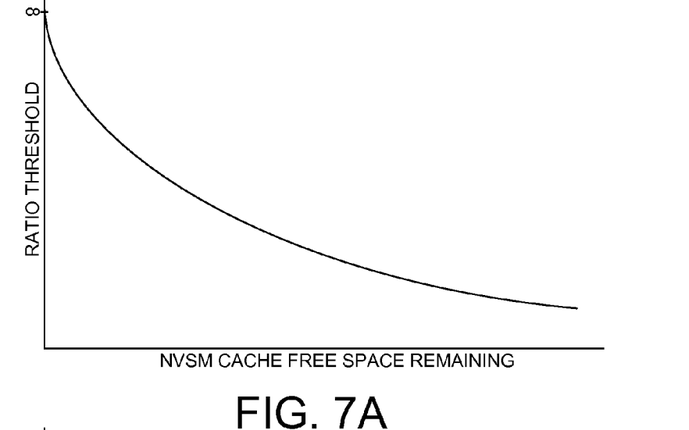
FIG. 7A shows an embodiment of the present invention wherein a disk/NVSM threshold is increased as the amount of free space remaining in the NVSM cache decreases.
Figure 7B:
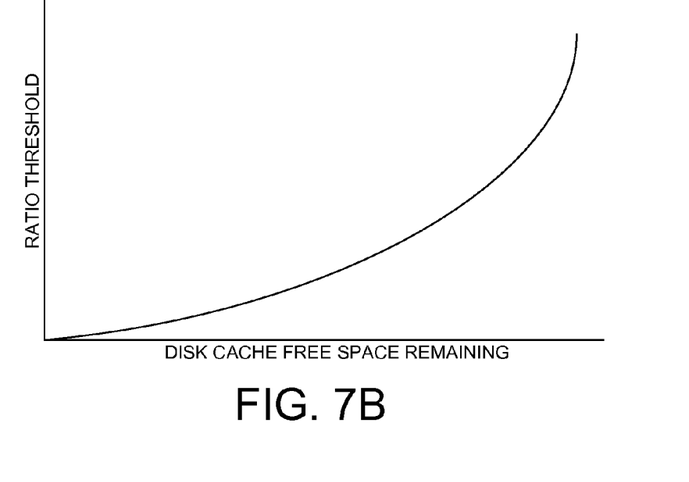
FIG. 7B shows an embodiment of the present invention wherein the disk/NVSM threshold is decreased as the amount of free space remaining in the disk cache decreases.

FIG. 7A shows an embodiment of the present invention wherein the threshold for the disk/NVSM counter threshold is increased as the amount of free space in the NVSM cache decreases. This embodiment helps prevent the NVSM cache from overflowing by routing more write data to the disk cache until the write data can be flushed from the NVSM cache. FIG. 7B shows the converse embodiment wherein the disk/NVSM counter threshold is decreased as the amount of free space in the disk cache decreases. This embodiment helps prevent the disk cache from overflowing by routing more write data to the NVSM cache until the write data can be flushed from the disk cache.

In one embodiment, the NVSM cache can be used to cache write data of new write commands while old write data stored in the disk cache is flushed to the non-cache area of the disk. Conversely, the disk cache can be used to cache write data of new commands while old write data stored in the NVSM cache is flushed to the non-cache area of the disk. In one embodiment, the write commands routed to the NVSM cache and the disk cache may be selected based on a rotational position optimization (RPO) algorithm which attempts to minimize the access time to the non-cache area of the disk by minimizing the seek and rotational latency. For example, a first group of write commands having closest proximity may be cached in the disk cache, and a second group of write commands having closest proximity may be cached in the NVSM cache. In this manner, the access latency is minimized when flushing either the disk cache or the NVSM cache to the non-cache area of the disk. In one embodiment, the disk cache and the NVSM cache may be flushed together during the same flush operation in which case the write data is read in an optimal order from both caches based on the RPO algorithm.

Figure 8:
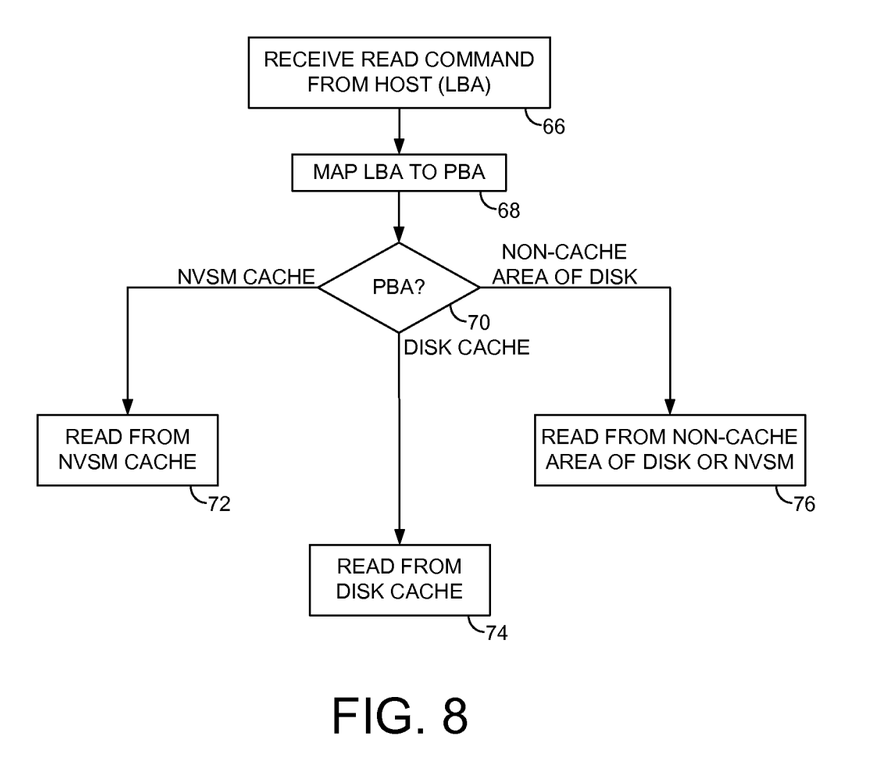
FIG. 8 is a flow diagram according to an embodiment of the present invention wherein when a read command is received, the data may be read from the NVSM cache, the disk cache, and/or the non-cache area of the disk.

FIG. 8 is a flow diagram according to an embodiment of the present invention wherein when a read command is received from a host (step 66) the LBA is converted into one or more PBAs of target data sectors (step 68). For example, an LBA may identify data that is cached in one of the NVSM and the disk cache, and/or the data may have been flushed to the non-cache area of the disk. Accordingly, in one embodiment a decision is made (step 70) to determine where to read the data. For example, in one embodiment the data is read from the NVSM cache (step 72) if stored there since the NVSM typically provides the highest performance. If the data is not stored in the NVSM cache but instead stored in the disk cache, then it may be read from the disk cache (step 74). If the data is not stored in the NVSM cache or the disk cache, it may be read from the non-cache area of the disk or from the non-cache area of the NVSM (step 76).

In one embodiment, data may be stored in multiple locations. For example, data may be stored in the NVSM cache and in the non-cache area of the disk after flushing the NVSM cache and before erasing the NVSM cache. Similarly, data may be stored in the disk cache and in the non-cache area of the disk after flushing the disk cache and before overwriting the disk cache. In this manner, a decision may be made to read the data from the location that provides the best performance, and in one embodiment, the data for different read commands may be read concurrently from multiple locations (e.g., concurrently from the NVSM cache and from the disk). In one embodiment, after flushing the NVSM cache and/or the disk cache the old data remains in the cache as long as possible before erasing the block in the NVSM cache or overwriting the data in the disk cache. This embodiment improves performance by allowing the data to be read from either the write cache (NVSM or disk) and/or the non-cache area of the disk. In one embodiment, the data may be evicted from either write cache using any suitable eviction policy, such as evicting the least recently accessed data or least frequently accessed data.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on.

In yet another embodiment, the control circuitry comprises suitable logic circuitry, such as state machine circuitry.

What is claimed is:

1. A hybrid drive comprising:
    a disk comprising a plurality of data tracks, each data track comprising a plurality of data sectors;
    a head actuated over the disk;
    a non-volatile semiconductor memory (NVSM) comprising a plurality of memory segments; and
    control circuitry operable to:
        define a disk cache comprising a plurality of the data sectors and a NVSM cache comprising a plurality of the memory segments;
        receive a write command from a host including write data;
        determine whether to write the write data to one of the disk cache and the NVSM cache in response to a disk counter and a NVSM counter;
        write the write data to one of the disk cache and the NVSM cache;
        increment the disk counter when data is written to the disk cache;
        increment the NVSM counter when data is written to the NVSM cache; and
        flush the write data to a non-cache area of the disk.

2. The hybrid drive as recited in claim 1, wherein the control circuitry is further operable to map a logical block address (LBA) received with the write command to a physical block address (PBA) assigned to a data sector in the non-cache area of the disk.

3. The hybrid drive as recited in claim 1, wherein the control circuitry is further operable to determine whether to write the write data to one of the disk cache and the NVSM cache in response to a ratio of the disk counter and the NVSM counter.

4. The hybrid drive as recited in claim 3, wherein the control circuitry is further operable to write the write data to the disk cache when the ratio of the disk counter to the NVSM counter exceeds a threshold.

5. The hybrid drive as recited in claim 4, wherein the control circuitry is further operable to adjust the threshold in response to a free space remaining in the NVSM cache.

6. The hybrid drive as recited in claim 4, wherein the control circuitry is further operable to adjust the threshold in response to a free space remaining in the disk cache.

7. The hybrid drive as recited in claim 4, wherein the control circuitry is further operable to adjust the threshold in response to a life remaining of the NVSM.

8. The hybrid drive as recited in claim 1, wherein the control circuitry is further operable to write the write data to the NVSM cache when the head is away from the disk cache.

9. The hybrid drive as recited in claim 1, wherein the control circuitry is further operable to write the write data to the disk cache when the NVSM is busy servicing other access commands.

10. The hybrid drive as recited in claim 1, wherein the control circuitry is further operable to adjust a size of the NVSM cache in response to a life remaining of the NVSM.

11. The hybrid drive as recited in claim 1, wherein the control circuitry is further operable to flush the write data to the non-cache area of the disk during an idle mode of the hybrid drive.

12. The hybrid drive as recited in claim 1, wherein the control circuitry is further operable to:
    receive a read command from the host comprising a logical block address (LBA);

read data from the NVSM cache when the LBA is mapped to a physical block address (PBA) assigned to a memory segment of the NVSM cache;

when the LBA is not mapped to the NVSM cache, read data from the disk cache when the LBA is mapped to a PBA assigned to a data sector of the disk cache; and when the LBA is not mapped to the NVSM cache and the disk cache, read data from the non-cache area of the disk when the LBA is mapped to a PBA assigned to a data sector of the non-cache area of the disk.

13. A method of operating a hybrid drive, the hybrid drive comprising a disk comprising a plurality of data tracks, each data track comprising a plurality of data sectors, a head actuated over the disk, and a non-volatile semiconductor memory (NVSM) comprising a plurality of memory segments, the method comprising:

defining a disk cache comprising a plurality of the data sectors and a NVSM cache comprising a plurality of the memory segments;

receiving a write command from a host including write data;

determining whether to write the write data to one of the disk cache and the NVSM cache in response to a disk counter and a NVSM counter;

writing the write data to one of the disk cache and the NVSM cache;

incrementing a disk counter when data is written to the disk cache;

incrementing an NVSM counter when data is written to the NVSM cache; and flushing the write data to a non-cache area of the disk.

14. The method as recited in claim 13, further comprising mapping a logical block address (LBA) received with the write command to a physical block address (PBA) assigned to a data sector in the non-cache area of the disk.

15. The method as recited in claim 13, further comprising determining whether to write the write data to one of the disk cache and the NVSM cache in response to a ratio of the disk counter and the NVSM counter.

16. The method as recited in claim 15, further comprising writing the write data to the disk cache when the ratio of the disk counter to the NVSM counter exceeds a threshold.

17. The method as recited in claim 16, further comprising adjusting the threshold in response to a free space remaining in the NVSM cache.

18. The method as recited in claim 16, further comprising adjusting the threshold in response to a free space remaining in the disk cache.

19. The method as recited in claim 16, further comprising adjusting the threshold in response to a life remaining of the NVSM.

20. The method as recited in claim 13, further comprising writing the write data to the NVSM cache when the head is away from the disk cache.

21. The method as recited in claim 13, further comprising writing the write data to the disk cache when the NVSM is busy servicing other access commands.

22. The method as recited in claim 13, further comprising adjusting a size of the NVSM cache in response to a life remaining of the NVSM.

23. The method as recited in claim 13, further comprising flushing the write data to the non-cache area of the disk during an idle mode of the hybrid drive.

24. The method as recited in claim 13, further comprising:

receiving a read command from the host comprising a logical block address (LBA);

reading data from the NVSM cache when the LBA is mapped to a physical block address (PBA) assigned to a memory segment of the NVSM cache;

when the LBA is not mapped to the NVSM cache, reading data from the disk cache when the LBA is mapped to a PBA assigned to a data sector of the disk cache; and when the LBA is not mapped to the NVSM cache and the disk cache, reading data from the non-cache area of the disk when the LBA is mapped to a PBA assigned to a data sector of the non-cache area of the disk.

* * * * *